United States Patent
Chang et al.

(10) Patent No.: US 12,175,692 B2
(45) Date of Patent: Dec. 24, 2024

(54) METHOD AND SYSTEM FOR LOCALIZATION

(71) Applicant: NAVER LABS CORPORATION, Seongnam-si (KR)

(72) Inventors: Min Young Chang, Seongnam-si (KR); Su Yong Yeon, Seongnam-si (KR); Soo Hyun Ryu, Seongnam-si (KR); Dong Hwan Lee, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 371 days.

(21) Appl. No.: 17/814,715

(22) Filed: Jul. 25, 2022

(65) Prior Publication Data
US 2022/0358665 A1 Nov. 10, 2022

Related U.S. Application Data

(63) Continuation of application No. PCT/KR2020/012697, filed on Sep. 21, 2020.

(30) Foreign Application Priority Data

Aug. 31, 2020 (KR) .................. 10-2020-0110001

(51) Int. Cl.
*G06T 7/521* (2017.01)
*G06T 7/11* (2017.01)
*G06T 7/73* (2017.01)

(52) U.S. Cl.
CPC .............. *G06T 7/521* (2017.01); *G06T 7/11* (2017.01); *G06T 7/73* (2017.01); *G06T 2207/20081* (2013.01)

(58) Field of Classification Search
CPC ... G06T 7/521; G06T 7/11; G06T 7/73; G06T 2207/20081; G06T 2207/10028;
(Continued)

(56) References Cited

U.S. PATENT DOCUMENTS

| 11,927,668 | B2 * | 3/2024 | Fontijne | G06V 20/58 |
| 2020/0088882 | A1 * | 3/2020 | Shin | G06T 7/33 |
| 2021/0012555 | A1 * | 1/2021 | Zhou | G06V 20/56 |

FOREIGN PATENT DOCUMENTS

| JP | 2018531402 A | 10/2018 |
| KR | 1020160026989 A | 3/2016 |

(Continued)

OTHER PUBLICATIONS

Notice of Allowance issued in KR application No. 10-2020-0110001, dated Aug. 5, 2022.
(Continued)

*Primary Examiner* — Kent Yip
(74) *Attorney, Agent, or Firm* — Greer Burns & Crain Ltd.

(57) ABSTRACT

A localization method includes scanning a surrounding space by using laser outputted from a reference region; processing spatial information about the surrounding space based on a reflection signal of the laser; extracting feature vectors to which the spatial information has been reflected by using a deep learning network which uses space vectors including the spatial information as input data; and comparing the feature vectors with preset reference map data, and thus estimating location information about the reference region.

15 Claims, 14 Drawing Sheets

(58) Field of Classification Search
CPC ......... G06T 2207/20084; G01S 7/4817; G01S 17/50; G01S 17/89
USPC ........................................................ 382/153
See application file for complete search history.

(56) References Cited

FOREIGN PATENT DOCUMENTS

| KR | 1020160107742 A | 9/2016 |
| KR | 101925862 B1 | 12/2018 |
| KR | 1020200096725 A | 8/2020 |
| WO | 2007069721 A1 | 6/2007 |

OTHER PUBLICATIONS

Shohei Wakita, et al.; LaserVAE for Feature Description and an Application of Global Self-localization; Transactions of the Society of Instrument and Control Engineers; 2019; pp. 1-11.

Office action issued in Japanese patent application No. JP application No. 2022-550893, dated Sep. 5, 2023.

ISR issued in PCT/KR2020/012697, mailed Dec. 14, 2021.

Yungeun Choei et al.; Featured Voxel Based Urban Structure Recognition and 3-D Mapping for Unmanned Ground Vehicle; Journal of Institute of Control, Robotics and Systems 17(5), pp. 436-443; May 2011; Institute of Control, Robotics and Systems; http://www.dbpia.co.kr/journal/articleDetail?nodeId=NODE01922261.

S.M. An et al; Three-dimensional point cloud based sky view factor analysis in complex urban settings; International Journal of Climatology, 34: pp. 2685-2701 (2014); Published online Nov. 30, 2013 in Wiley Online Library (wileyonlinelibrary.com) DOI: 10.1002/joc.3868.

\* cited by examiner (a)

| No. | $V(r_i, \theta_j, \phi_k)$ | | Nr = 4, Nθ = 15, NØ = 8, j=1 | |
|---|---|---|---|---|
| 1 | V(1,1,1)=0 | V(2,1,1)=0 | V(3,1,1)=1 | V(4,1,1)=0.5 |
| 2 | V(1,1,2)=0 | V(2,1,2)=0 | V(3,1,2)=1 | V(4,1,2)=0.5 |
| 3 | V(1,1,3)=0 | V(2,1,3)=0 | V(3,1,3)=0 | V(4,1,3)=0 |
| 4 | V(1,1,4)=0 | V(2,1,4)=0 | V(3,1,4)=0 | V(4,1,4)=0 |
| 5 | V(1,1,5)=0 | V(2,1,5)=0 | V(3,1,5)=0 | V(4,1,5)=0 |
| 6 | V(1,1,6)=0 | V(2,1,6)=0 | V(3,1,6)=0 | V(4,1,6)=0 |
| 7 | V(1,1,7)=0 | V(2,1,7)=0 | V(3,1,7)=0 | V(4,1,7)=0 |
| 8 | V(1,1,8)=0 | V(2,1,8)=0 | V(3,1,8)=0 | V(4,1,8)=0 |

(b)

| No. | $V(r_i, \theta_j, \phi_k)$ | | Nr = 4, Nθ = 15, NØ = 8, j=2 | |
|---|---|---|---|---|
| 1 | V(1,2,1)=0 | V(2,2,1)=0 | V(3,2,1)=0 | V(4,2,1)=1 |
| 2 | V(1,2,2)=0 | V(2,2,2)=0 | V(3,2,2)=0 | V(4,2,2)=0 |
| 3 | V(1,2,3)=0 | V(2,2,3)=0 | V(3,2,3)=0 | V(4,2,3)=0 |
| 4 | V(1,2,4)=0 | V(2,2,4)=0 | V(3,2,4)=0 | V(4,2,4)=0 |
| 5 | V(1,2,5)=0 | V(2,2,5)=0 | V(3,2,5)=0 | V(4,2,5)=0 |
| 6 | V(1,2,6)=0 | V(2,2,6)=0 | V(3,2,6)=0 | V(4,2,6)=0 |
| 7 | V(1,2,7)=0 | V(2,2,7)=0 | V(3,2,7)=0 | V(4,2,7)=0 |
| 8 | V(1,2,8)=0 | V(2,2,8)=0 | V(3,2,8)=0 | V(4,2,8)=0 |

METHOD AND SYSTEM FOR LOCALIZATION

CROSS-REFERENCE TO RELATED APPLICATIONS

This is a continuation application of International Application No. PCT/KR2020/012697, filed Sep. 21, 2020, which claims the benefit of Korean Patent Application No. 10-2020-0110001, filed on Aug. 31, 2020, the contents of which are incorporated by reference herein in their entirety.

STATEMENT REGARDING PRIOR DISCLOSURES BY THE INVENTOR OR A JOINT INVENTOR

The following disclosures are submitted under 35 U.S.C. § 102(b)(1)(A):
  https://docs.google.com/presentation/d/1Ouvo58Wff6p7a5ZiHa0dgcNhZoeCx8DYPbjJ6ad-3Ew/edit#slide=id.g81a40417dd_0_22, Mar. 2, 2020;
  https://docs.google.com/presentation/d/1Ouvo58Wff6p7a5ZiHaa0dgcNhZoeCx8DYPbjJ6ad-3Ew/edit#slide=id.g81a40417dd_0_22, Mar. 2, 2020;
  https://www.youtube.com/watch?v=QpLGiARXvQw, Apr. 5, 2020.

BACKGROUND OF THE INVENTION

Field of Invention

The present disclosure relates to a method and system for localization of a device.

Description of Related Art

As technologies develop, various service devices emerge, and recently, development of technologies about robots which perform various tasks or services is actively ongoing.

Further, as artificial intelligence technology, cloud technology, etc. develop, the degree of utilization of robots is gradually increased.

Meanwhile, in order to provide various tasks or services by a robot, it is very important to precisely check the current position of the robot. Accordingly, research on estimation of the location of a device including a robot is variously ongoing.

For instance, as localization technologies, there exist a technology capable of estimating a current location based on a characteristic vector obtained by acquiring surrounding environment information by using a lidar and then by representing the information into voxels, as shown in Korean Registration Patent No. 10-1925862 (Real-time 3D map generation method and system using 3D LiDAR), etc.

Recently, the degree of utilization of a robot is gradually increased even in an indoor space (e.g., an airport, a department store, etc.), and accordingly, there exist a need for technologies capable of precisely estimating a robot's location even in an indoor space. Especially, when compared with an outdoor space, an indoor space is narrower, and has a higher degree of congestion due to movements of people and objects such as structures. Accordingly, conventional localization methods may have lowered accuracy. Thus, required is a development of technologies capable of precisely estimating the current location of a robot even when an indoor space is congested due to movements of people, structures, etc.

This invention was supported by Development of Innovation Technology for ICT Industry Convergence (R& D) program of MSIT (Ministry of Science and ICT) and IITP (Institute of Information & Communications Technology Planning & Evaluation). [1711152900, 2019-0-01309-004, Development of AI Technology for Guidance of a Mobile Robot to its Goal with Uncertain Maps in Indoor/Outdoor Environments, 2022.01.01~2022.12.31, Lead Organization: Electronics and Telecommunications Research Institute].

BRIEF SUMMARY OF THE INVENTION

Therefore, an aspect of the present disclosure is to provide a method and system for localization, capable of precisely checking the position of a device such as a robot in an indoor space.

Further, the present invention provides a method and system for localization, capable of proposing a new type of data processing method which can overcome limitations in localization in an indoor space.

More specifically, the present invention provides a method and system for localization based on point clouds, capable of considering features of an object such as a person or a structure.

Further, the present invention provides a deep learning network capable of enhancing performance of a lidar-based position recognition algorithm. More specifically, the present invention provides a new type of preprocessing method with respect to input data inputted to a deep learning network, for more precise localization.

In order to achieve these and other advantages and in accordance with the purpose of this specification, as embodied and broadly described herein, there is provided a localization method including: scanning a surrounding space by using laser outputted from a reference region; processing spatial information about the surrounding space, based on a reflection signal of the laser; extracting feature vectors to which the spatial information has been reflected, by using a deep learning network which uses space vectors including the spatial information as input data; and comparing the feature vectors with preset reference map data, and thus estimating location information about the reference region, wherein in the processing of the spatial information, occupancy information related to an occupancy state of an object located in the surrounding space is allocated to a plurality of voxels on spherical coordinates corresponding to the surrounding space, based on the reflection signal of the laser which is reflected from the object.

Further, there is also provided a localization system, including: a scanning unit configured to scan a surrounding space by using laser outputted from a reference region; a processing unit configured to process spatial information about the surrounding space, based on a reflection signal of the laser; a deep learning unit configured to extract feature vectors to which the spatial information has been reflected, by using a deep learning network which uses space vectors including the spatial information as input data; and a controller configured to compare the feature vectors with preset reference map data, and thus to estimate location information about the reference region, wherein the processing unit allocates occupancy information related to an occupancy state of an object located in the surrounding space, to a plurality of voxels on spherical coordinates, based on the reflection signal of the laser which is reflected from the object.

As aforementioned, in the method and system for localization according to the present invention, information related to an occupancy state of an object may be represented on voxels, based on a reflection signal of laser. Here, a space is divided into voxels on spherical coordinates. This may allow a radiation characteristic of laser to be reflected more precisely on the voxels on the spherical coordinates, thereby enabling more precise localization.

Further, in the present invention, in the case of representing information related to an occupancy state of an object, an occupancy state about a space where laser has not reached is newly defined. This may allow a space blocked by an object such as a person or a structure to be additionally considered. In this case, occupancy information of the space where laser has not reached may be defined as information different from occupancy information of a region where laser has passed or a region where laser has been reflected. In the present invention, localization is performed by additionally considering a blocked space. This may allow localization to be performed with high accuracy even in an indoor space.

The present invention proposes a deep learning network including an integrator which can reflect information about a surrounding space of a specific voxel together with information about the specific voxel. Accordingly, characteristics (features) of a space which is a target of localization may be considered comprehensively, and consequently, performance of localization may be enhanced.

BRIEF DESCRIPTION OF THE DRAWINGS

FIGS. 6A, 6B, 7A, 7B, 8A and 8B are conceptual illustrations for explaining a method of defining an occupancy state in a method and system for localization according to the present invention.

DETAILED DESCRIPTION OF THE INVENTION

Figure 1:
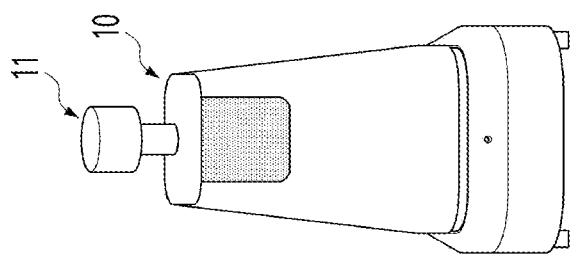
FIGS. 1 and 2 are conceptual illustrations for explaining a method and system for localization according to the present invention.
Figure 1:
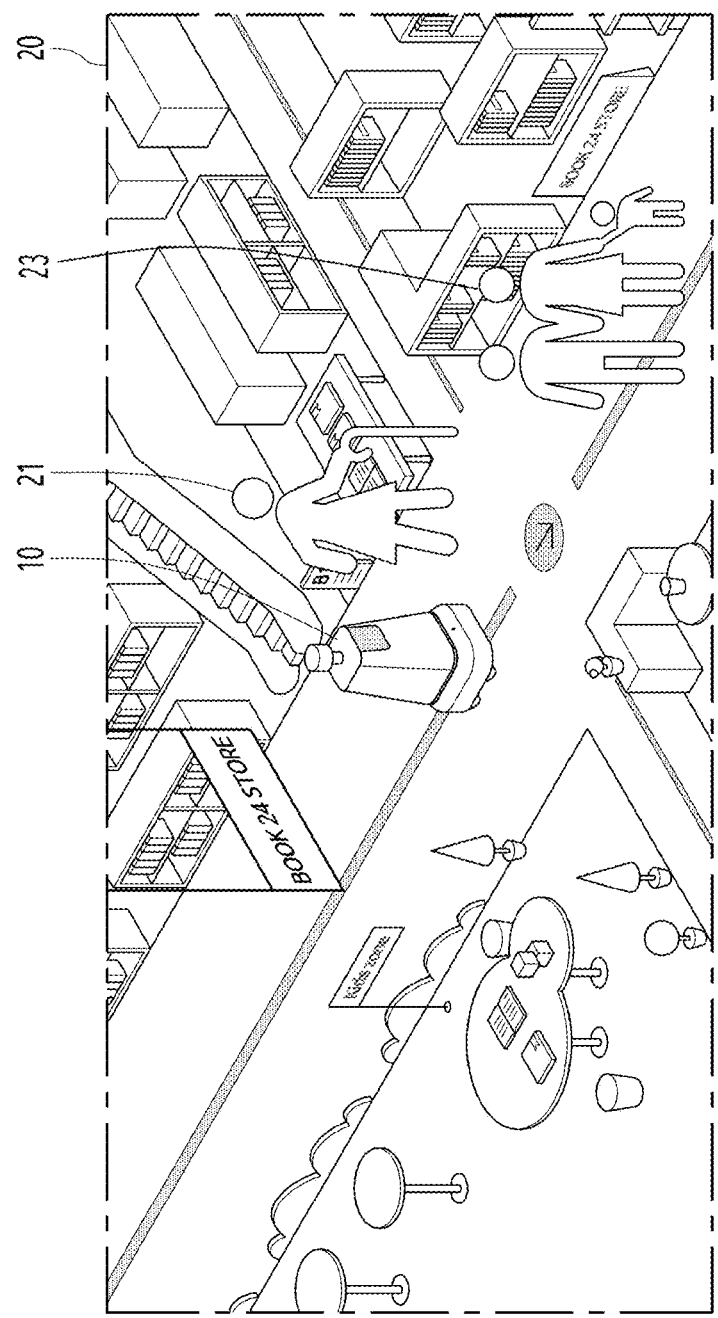

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

As explained above, the present invention provides a method and system for localization, capable of precisely checking a position of a device such as a robot in an indoor space. Especially, the present invention provides a method and system for localization, capable of proposing a new type of data processing method which can overcome limitations in localization in an indoor space.

More specifically, the present invention provides a method and system for localization based on point clouds, capable of considering features (characteristics) of an object such as a person or a structure. The present invention proposes a localization method using LiDAR (Light Detection And Ranging) ("lidar").

In the present invention, "localization" may be replaced by various expressions such as "location search", "location specification", "location finding", and "location check". For convenience of explanations, the term of "localization" will be used for unity.

In the present invention, an object arranged in space is detected based on laser outputted from lidar and a reflection signal reflected from an object at which the laser has arrived, thereby sensing spatial features, and the spatial features are compared to a preset reference map, thereby estimating location information about a laser output region. As used here, the term "laser" refers to a light or a beam generated by a laser device.

In order to prevent the gist of the present invention from becoming obscure, technical descriptions about lidar and technical descriptions about object sensing will be omitted in this specification.

The term "object" used in the present invention means a thing arranged in space, a target to be sensed by lidar, which may be understood as a concept including all of persons, animals and things.

Further, in the present invention, a location (a place or a region) which is a target to be estimated may be understood as a region including a location of a sensor (or lidar) which outputs laser.

Here, the lidar may be provided in a device, and the type of the device having the lidar may greatly vary. That is, any type of device may be used if it is provided with lidar. For instance, the device may be a robot, an unmanned moving machine, an autonomous moving machine, etc.

For instance, in a case where lidar is provided in a robot, the method and system for localization according to the present invention may be expressed as "estimation of a robot's location".

Figure 2:
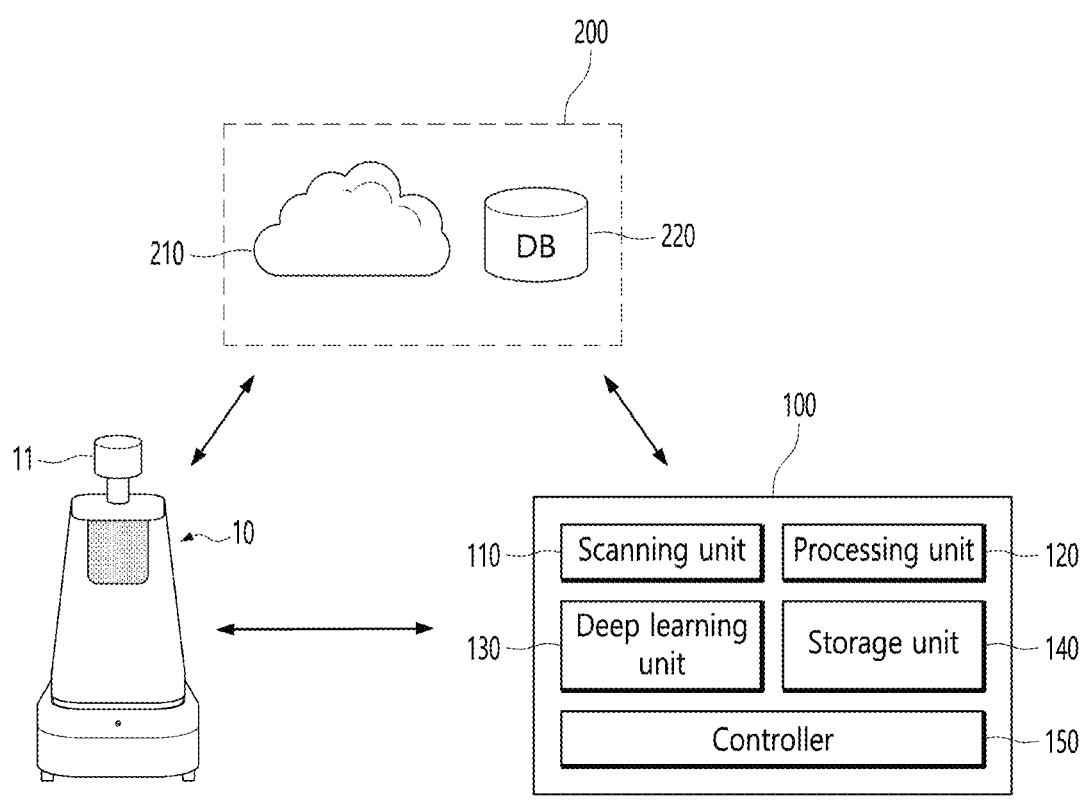
Figure 3:
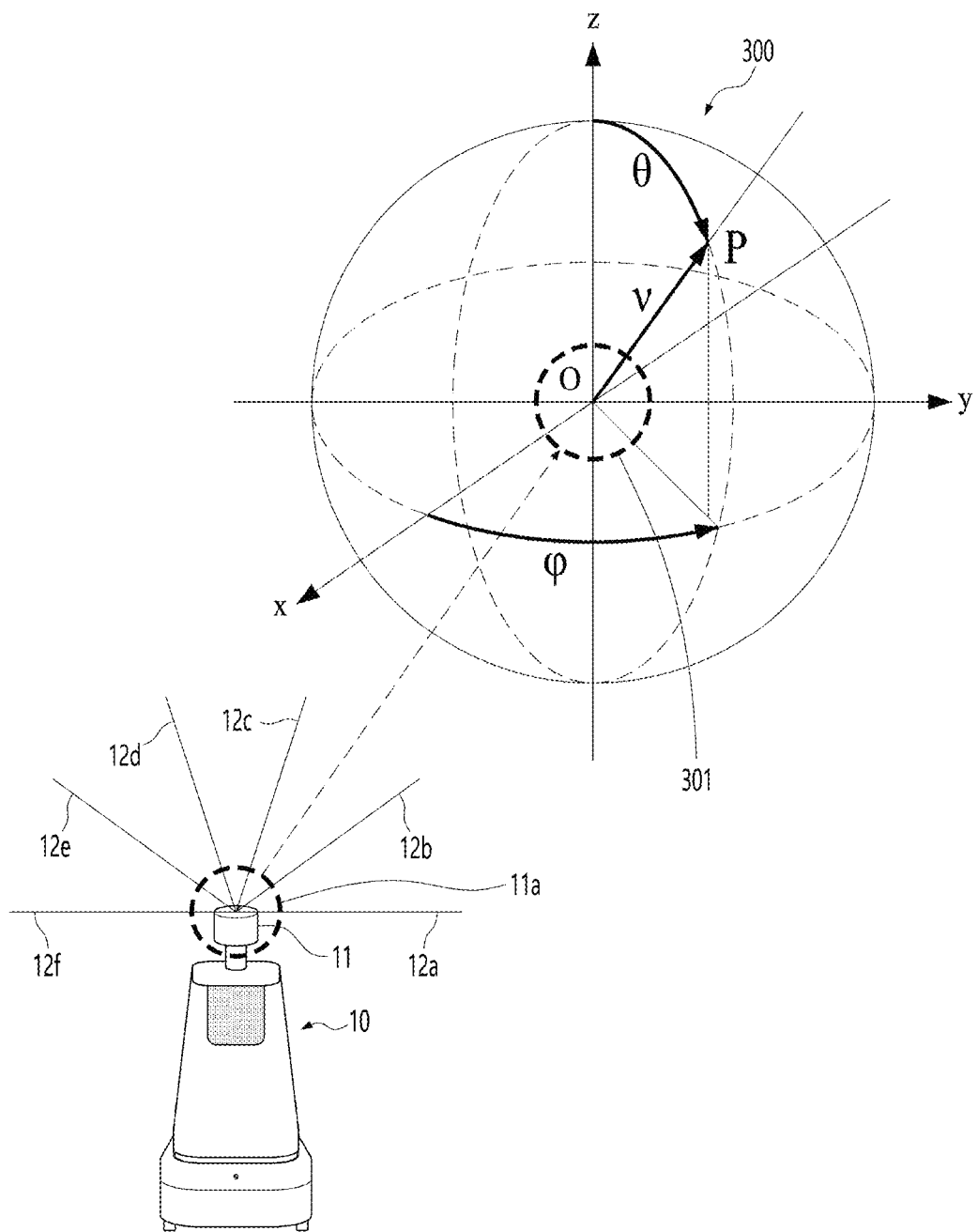
FIGS. 3 and 4 are conceptual illustrations for explaining a method of utilizing a spherical coordinate system in a localization method according to the present invention.
Figure 4:
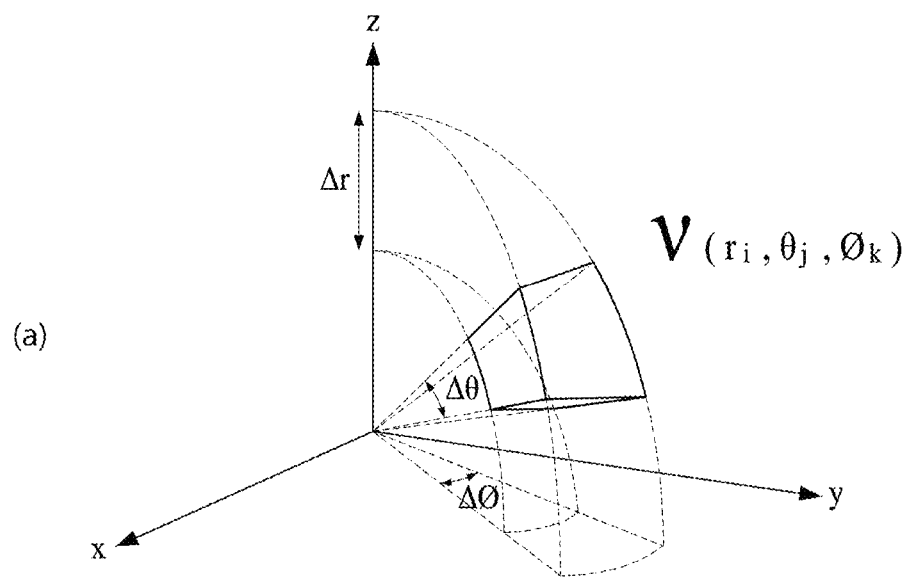
Figure 4:
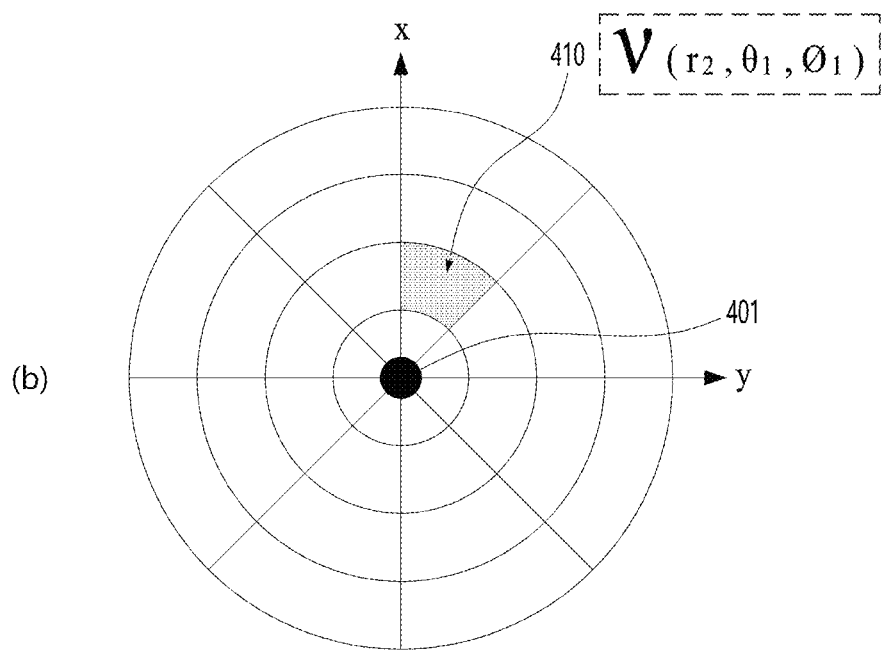

The present invention relates to a method and system for localization capable of estimating a location more precisely by reflecting characteristics of an indoor space. Hereinafter, the present invention will be explained in more detail with reference to the attached drawings. FIGS. 1 and 2 are conceptual illustrations for explaining a method and system for localization according to the present invention. FIGS. 3 and 4 are conceptual illustrations for explaining a method of utilizing a spherical coordinate system in a localization method according to the present invention.

As shown in FIG. 1, the present invention is provided to estimate the location of a device 10 having a lidar 11. Hereinafter, for convenience of explanations, "estimation of the location of a device 10 having a lidar 11" will be expressed as "estimation of the location of a device 10."

In the present invention, a space (or a surrounding space 20) where the device 10 is located is scanned by the lidar 11. Then, the location of the device 10 may be estimated based on the result of the scanning. The surrounding space 20 of the device 10 may be an indoor space as shown. Such an indoor space may be various types of spaces such as a department store, an airport, a school, a building, a subway station, a train station and a bookstore.

Such an indoor space is narrow compared to an outdoor space, and is blocked due to movements of persons 21, 23, structures, etc., thereby causing the device 10 not to precisely sense the surrounding space therein. In this case, spatial information sensed by the device 10 may be different from a reference map preset with respect to the surrounding space. For instance, the reference map may be formed based on sensing of a space without people. Here, as shown in FIG. 1, in a case where persons 21, 23 are located in the space 20, the device 10 may obtain spatial information different from a reference map due to the existence of the persons 21, 23, despite the same space 20 for which the reference map was formed. Accordingly, the present invention proposes a method capable of estimating the location of the device 10 more precisely despite the existence of such objects.

More specifically, as shown in FIG. 2, a localization system 100 of the present invention may include a scan unit 110, a processing unit 120, a deep learning unit 130, a storage unit 140 and a controller 150.

Here, the scan unit 110 includes the lidar 11 of the device 10, and may be configured to scan a surrounding space of the device 10 based on laser outputted from the lidar 11.

The processing unit 120 may be configured to process information about the surrounding space based on scanning of the surrounding space by the scan unit 110. The processing unit 120 may be configured to process spatial information about the surrounding space based on a reflection signal with respect to laser.

As shown in FIG. 3, the spatial information may be configured as information represented on a spherical coordinate system (or spherical coordinates).

That is, the processing unit 120 may be configured to encode structural information (point clouds) about the surrounding space scanned by the scan unit 110, into information about voxels on spherical coordinates.

Here, the structural information includes information about which region is occupied by an object, and may be obtained as laser reaches an object and the laser is reflected.

The spatial information may include occupancy information about each voxel which forms a spherical coordinate system. Further, the occupancy information is information related to the occupancy state of an object with respect to each voxel, which will be explained in more detail in the later descriptions.

Next, the deep learning unit 130 may be configured to extract a feature vector corresponding to spatial information, by using the spatial information.

The deep learning unit 130 may be configured to extract a feature vector by using at least one artificial intelligence algorithm.

Figure 9A:
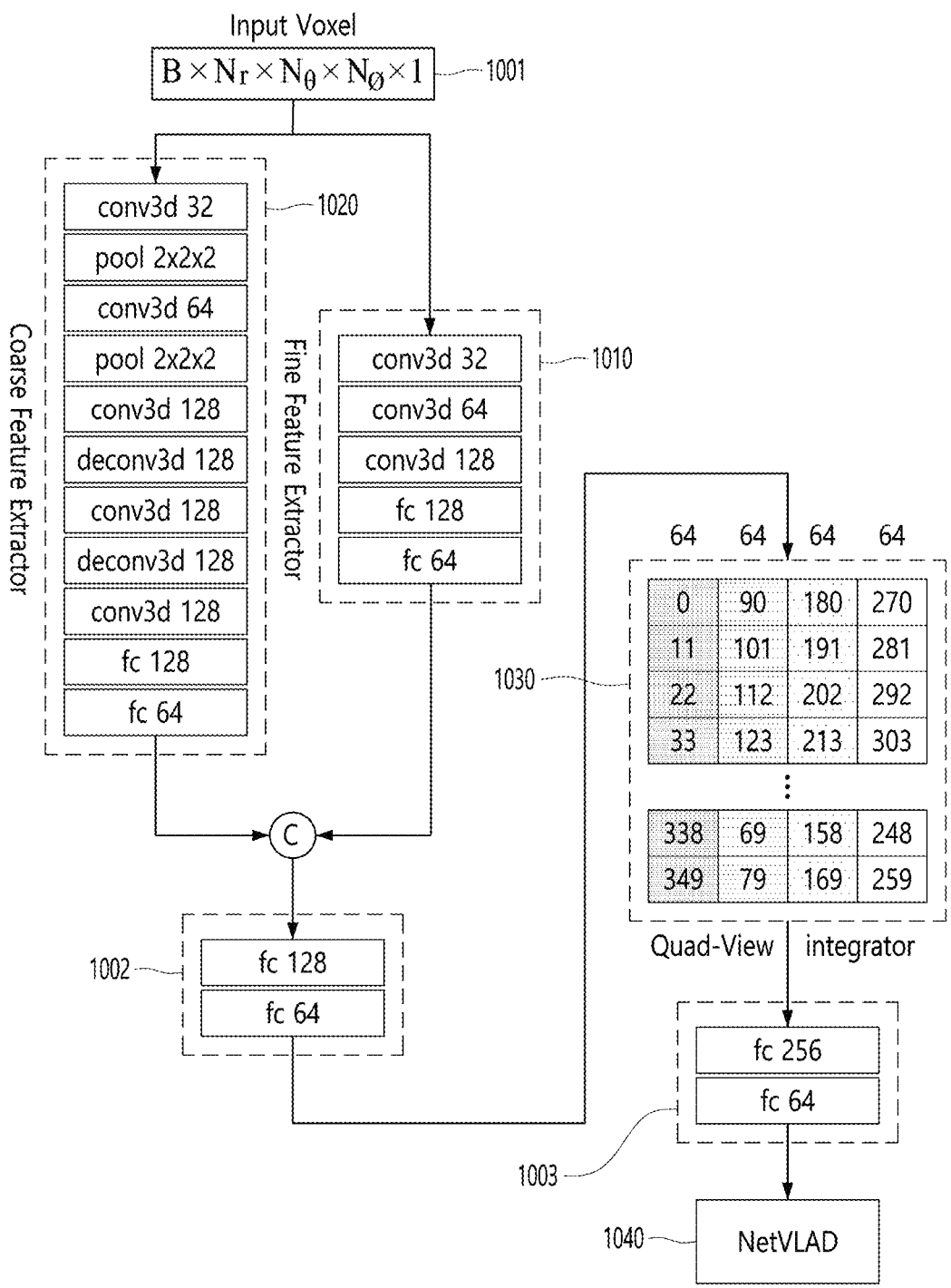
FIGS. 9A to 9C are conceptual illustrations for explaining a deep learning network structure in a method and system for localization according to the present invention.

The deep learning unit 130 includes a deep learning network, and such a deep learning network may include at least one data preprocessing module (or a preprocessor) (See FIG. 9A).

More specifically, the deep learning network of the present invention may include at least one of a fine feature extractor which performs preprocessing about spatial information, a coarse feature extractor, and an integrator.

Further, the deep learning unit 130 of the present invention may extract a feature vector by inputting data which has passed the aforementioned preprocessing module to NetV-LAD.

Here, the feature vector means scan information (or spatial information) about the surrounding space (or space) scanned by the scan unit 110, expressed as a vector. Such a feature vector may be a target which is compared with a preset reference map.

The feature vector may be named as various terms, for instance, may be named as a global vector or a global descriptor vector.

The preset reference map may include a plurality of vectors precisely established with respect to a surrounding space, and a set of such plurality of vectors may be named as a global descriptor set.

Next, the storage unit 140 may be configured to store therein various information related to the present invention.

The controller 150 controls at least one of the aforementioned components, and may perform entire controls for localization of the present invention.

The controller 150 may estimate location information about a reference region which is a target of localization, by comparing a feature vector extracted by the deep learning unit 130 with a preset reference map.

More specifically, the controller 150 may compare a feature vector with preset reference map data (e.g., a set of a plurality of vectors), and may specify a vector closest (or the most similar) to the feature vector among the preset reference map data. And, the controller 150 may estimate location information matched with the specified vector, as location information about a reference region.

In the present invention, targets to be compared with the feature vector are not limited to the plurality of vectors included in the preset reference map. That is, in the present invention, even if a preset reference map does not exist, it is possible to compare a feature vector with a map generated based on a SLAM (Simultaneous Localization and Mapping) technique. In this case, the controller 150 may generate a map of the space 20 based on scanning information through the scan unit 110, and may compare the feature vector with a data set (e.g., a set of a plurality of vectors) which constitutes the generated map. In this case, the data set which constitutes the generated map, and the feature vector may be included in a single data set.

The processing unit 120, the deep learning unit 130, the storage unit 140 and the controller 150 may be implemented using any type of device capable of processing data, such as a processor. Here, the processor may refer to a hardware built-in data processing device having a circuit physically structured to perform functions expressed in codes or instructions included in computer programs. Examples of the hardware built-in data processing device may include processing devices such as a microprocessor, a central processing unit (CPU), a processor core, a multiprocessor, an application-specific integrated circuit (ASIC), a field programmable gate array (FPGA), etc.

The storage unit 140 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk.

Although not shown, the localization system 100 of the present invention may further include a communication unit, and the communication unit may be configured to communicate with the device 10 having the lidar 11 mounted thereto included in the scan unit 110.

Further, the communication unit may be configured to communicate with at least one external server (or an external storage unit 200). Here, the external server 200 may be configured to include at least one of a cloud server 210 and a database 220, as shown. Meanwhile, the external server 200 may be configured to perform at least one role of the controller 150. That is, the external server 200 can perform data processing or data computation. In the present invention, there is no limitations on such a manner.

In the present invention, the controller 150 may control laser to be outputted for scanning the surrounding space through the scan unit 110, and may control the processing unit 120 to process spatial information about the surrounding space based on a reflection signal with respect to the laser.

Here, the spatial information corresponds to the reflection signal. The controller 150 may represent such spatial information as information on a spherical coordinate system 300, as shown in FIG. 3.

As shown, an origin 301 of the spherical coordinate system 300 is a point 11a from which laser has been outputted, and may correspond to a position 11a of the lidar 11 included in the scan unit 110. In the present invention, a region including the point 11a from which laser has been outputted may be expressed as a "reference region". In the present invention, a location which is a target to be estimated may be understood as a location including the "reference region".

Spatial information on the spherical coordinate system 300 may be specified as i) a distance (v) from the origin 301, ii) an angle (θ) between the origin 301 and z-axis, and iii) an angle (Φ) between the origin 301 and x-axis. In the present invention, the origin on the spherical coordinate system 300 corresponds to a point from which laser has been output, and thus the reference region may correspond to the origin 301 of the spherical coordinate system 300. Accordingly, in the present specification, the terms of the origin and the reference region will be used together.

For convenience, in the present invention, i) the distance (v) from the origin 301 will be named as a radius distance (v), ii) the angle (θ) between the origin 301 and the z-axis will be named as a "polar angle (θ)", and iii) the angle (Φ) between the origin 301 and the x-axis will be named as a "radiation angle (Φ)". Here, information on the spherical coordinate system 300 may be expressed as (r, θ, Φ).

The origin on the spherical coordinate system 300 has a coordinate value corresponding to (0, 0,0), and the coordinate value may be a coordinate value of the point 11a from which laser has been output.

As shown in FIG. 3, each of lasers 12a, 12b, 12c, 12d, 12e, 12f outputted from the lidar 11 may be expressed as a coordinate value corresponding to a specific point on the spherical coordinate system 300, based on a reflection point from an object located in space.

The lasers 12a, 12b, 12c, 12d, 12e, 12f outputted from the lidar 11 have a radiation characteristic. In the present invention, spatial information may be represented on the spherical coordinate system so that the spatial information may be expressed more precisely according to such radiation characteristic of the lasers.

As shown in FIG. 4(a), the controller 150 may encode spatial information into voxels on the spherical coordinate system.

As shown in FIG. 4(a), the spherical coordinate system may be divided into a plurality of voxels. The voxels which form the spherical coordinate system may have volumes defined by segmenting each of the radius distance (v), the polar angle (θ), and the radiation angle (Φ) by a predetermined displacement (Δ). Thus, each voxel may have a volume corresponding to (Δr, Δθ, ΔΦ).

Here, each of the radius distance (v), the polar angle (θ), and the radiation angle (Φ) may have a different degree of the predetermined displacement (Δ). Each of the voxels may be defined as V(ri, θj, Φk). Here, the "i, j and k" represent the number of segmentations (the order or the degree) of the radius distance (v), the polar angle (θ),and the radiation angle (Φ), and have larger values when a position is farther from the origin.

For convenience, in the present invention, the radius distance (v) may be segmented into 4 regions on the basis of a specific distance, the polar angle (θ) may be segmented into 15 regions on the basis of 180° (one region has a displacement of 12), and the radiation angle (θ) may be segmented into 8 regions on the basis of 360° (one region has a displacement of 45). Here, the "specific distance" by which the radius distance (v) is segmented may be an arrival threshold distance of the lidar.

In the above case, i) the spherical coordinate system may be segmented into 4 regions on the basis of the radius distance ((Nr=4), ii) the spherical coordinate system may be segmented into 15 regions on the basis of the polar angle (Nθ=15), and iii) the spherical coordinate system may be segmented into 8 regions on the basis of the radiation angle (NΦ=8). In this case, the spherical coordinate system may be segmented into a total of 320 (4×15×8=320) voxels.

In this case, the "i, j, k" for defining the voxels V(ri, θj, Φk) may be i∈[1, Nr=4], j∈[1, Nθ=15] and k∈[1, NΦ=8], respectively.

For convenience, in the present invention, a 3-dimensional (3D) spherical coordinate system is briefly expressed as a 2-dimensional (2D) coordinate system as shown in FIG. 4(b). In the 2D coordinate system shown in FIG. 4(b), the representation of the polar angle (θ) is omitted. Under an assumption that a polar angle of the 2D coordinate system is 1 (θj=1), a specific voxel 410 may be represented as V(r2, θ1, Φ1).

Figure 5:
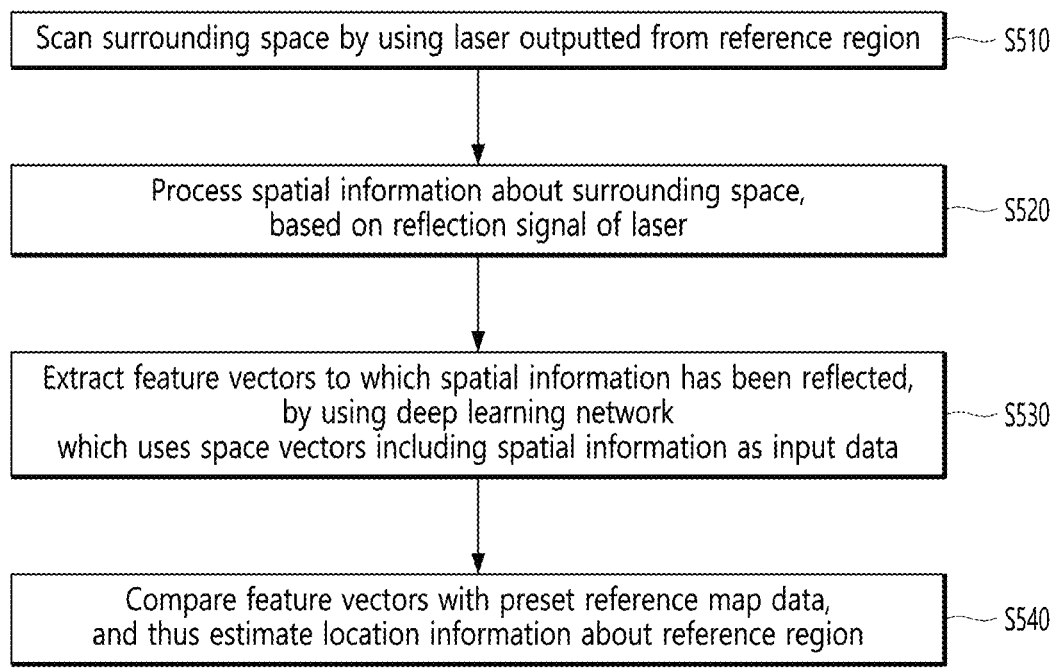
FIG. 5 is a flowchart for explaining a localization method according to the present invention.

Hereinafter, a method of estimating location information by using voxels on a spherical coordinate system will be explained in more detail with reference to the attached drawings. FIG. 5 is a flowchart for explaining a localization method according to the present invention. FIGS. 6A, 6B, 7A, 7B, 8A and 8B are conceptual illustrations for explaining a method of defining an occupancy state in a method and system for localization according to the present invention, and FIGS. 9A to 9C are conceptual illustrations for explaining a deep learning network structure in a method and system for localization according to the present invention.

Firstly, in the present invention, a surrounding space is scanned by using a laser outputted from a reference region (S510). As aforementioned, the reference region is a region including a point 11a (refer to FIG. 3) where laser has been output, which corresponds to a location to be estimated in the present invention. Next, in the present invention, spatial information about the surrounding space is processed on the basis of a reflection signal with respect to the laser (S520).

Here, the processing of the spatial information may include a step of receiving a reflection signal with respect to laser, and allocating occupancy information to each of a plurality of voxels on a spherical coordinate system, in correspondence to the received reflection signal.

Figure 6A:
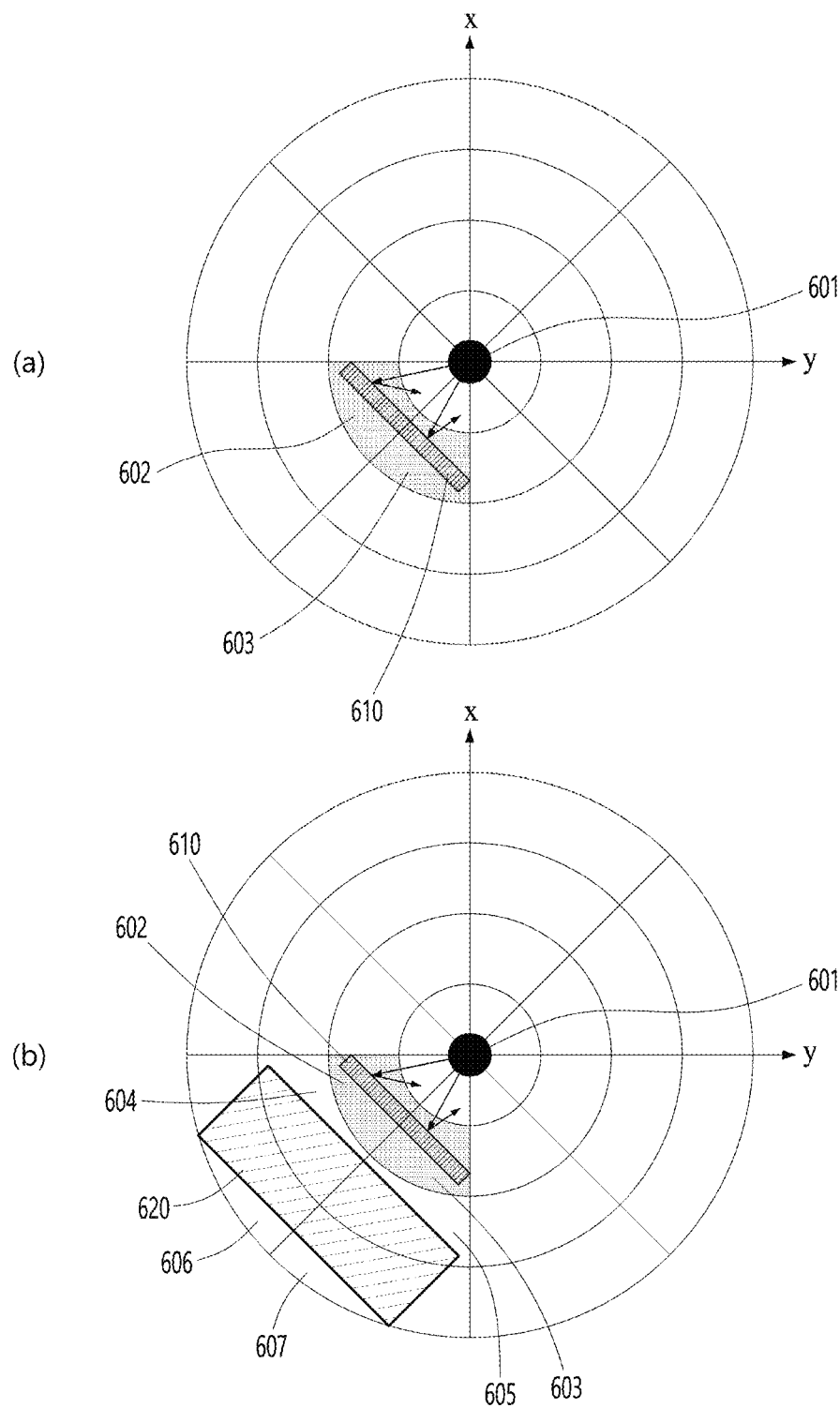

More specifically, as shown in FIG. 6A(a), in a case where an object 610 exists in a surrounding space, laser may be refracted when it reaches the object 610. On the basis of such refraction, a reflection signal with respect to the laser is generated, and the scan unit 110 may receive such a reflection signal. The processing unit 120 may be configured to process spatial information by using such a reflection signal.

The processing unit 120 may measure the distance from a reference region 601 to the specific object 610, on the basis of the time duration taken for the reflection signal to be received after the laser is outputted. Further, the processing unit 120 may collect polar angle information and radiation angle information of the laser from the scan unit 110. In this manner, the processing unit 120 may specify an arrival distance of laser from the reference region 601 to the object 610, polar angle information and radiation angle information of laser. And the processing unit 120 may specify a voxel where the specific object 610 is located (or exists) on the basis of the specified information.

If a voxel is specified based on a reflection signal of laser, the processing unit 120 may allocate information indicating the existence of an object, to the corresponding voxel. In this manner, the processing unit 120 may allocate occupancy information indicating whether an object exists or not, to each voxel.

For instance, if the object 610 exists at regions corresponding to a first voxel 602 and a second voxel 603, laser outputted from the reference region 601 may be reflected from the first voxel 602 and the second voxel 603. The processing unit 120 may determine that an object exists at the first voxel 602 and the second voxel 603, based on a reflection signal from the first voxel 602 and the second voxel 603, and allocate occupancy information indicating the existence of such an object, to the first voxel 602 and the second voxel 603.

As shown in FIG. 6A(a), in a case where laser reaches the specific object 610, the laser is reflected from the specific object 610 at which the laser has arrived. Thus, as shown in FIG. 6A(b), the laser may not reach another object 620 blocked by the specific object 610.

In this case, the scan unit 110 may not be able to sense the region blocked by the specific object 610, by using laser. Accordingly, the processing unit 120 may allocate occupancy information to each voxel with consideration of a region where laser does not reach.

The processing unit 120 may allocate occupancy information related to an occupancy state of an object, to a plurality of voxels on a spherical coordinate system which correspond to surrounding spaces, on the basis of the reference region 601.

Figure 6B:
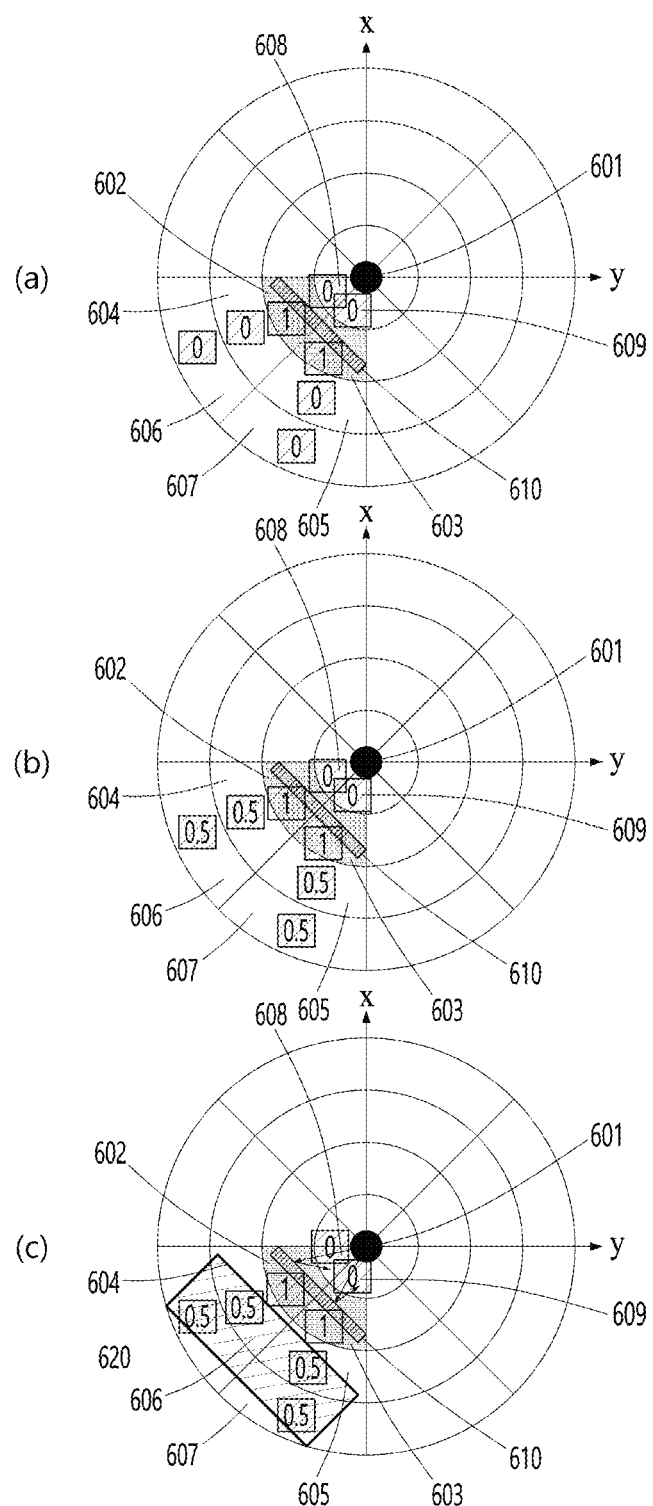

For instance, referring to FIG. 6B(a), in the case of allocating occupancy information to each voxel in the conventional art, information of "1" was allocated to voxels 602, 603 where an object exists, and information of "0" was allocated to voxels 608, 609 where an object does not exist. However, in this case, voxels 604, 605, 606, 607 corresponding to regions blocked by the object (where laser does not reach) were also processed as voxels having no object. Thus, in the conventional art, all of the voxels 608, 609 having no object and the voxels 604, 605, 606, 607 corresponding to regions blocked by the object (where laser does not reach) were allocated with occupancy information of "0". As such, even if an object substantially exists at a region blocked by an object, the region was processed as a region having no object. As a result, performance of localization was lowered.

Accordingly, in order to solve such a problem, the present invention proposes a method of enhancing performance of localization by allocating occupancy information by categorizing features of voxels into at least three. More specifically, in the present invention, a plurality of voxels on a spherical coordinate system may be categorized into i) a first voxel type in which laser has passed, ii) a second voxel type in which laser has been reflected, and iii) a third voxel type in which laser has not reached due to an object.

The processing unit 120 may allocate different occupancy information to each voxel corresponding to each of the first to third voxel types, based on a reflection signal of laser.

In the present invention, information to specify a voxel (e.g., coordinate information of a voxel) and occupancy information of a voxel may be named as "spatial information".

As explained above, the processing unit 120 may allocate different occupancy information to each voxel corresponding to each of the first to third voxel types, based on a reflection signal of laser. Here, the different occupancy information may include i) first occupancy information allocated to a voxel corresponding to the first voxel type where laser has passed, ii) second occupancy information allocated to a voxel corresponding to the second voxel type where laser has been reflected, and iii) third occupancy information allocated to a voxel corresponding to the third voxel type where laser has not reached.

In the present invention, the third occupancy information allocated to a voxel corresponding to the third voxel type may be formed to have a value between the first occupancy information allocated to a voxel corresponding to the first voxel type and the second occupancy information allocated to a voxel corresponding to the second voxel type.

The occupancy information having three types may be named as a ternary occupancy value. The occupancy information is a probability value indicating whether an object exists at a voxel. If a probability of the existence of an object at a voxel is sure, a value of "1" (the probability of the existence of an object is 100%) may be allocated to a corresponding voxel, and if a probability of the existence of an object at a voxel is zero, a value of "0" (the probability of the existence of an object is 0%) may be allocated to a corresponding voxel. Therefore, a region blocked by an object may have a probability value between 0 and 1, because an object may exist or not therein.

In the present invention, as shown in FIGS. 6B(b) and (c), the processing unit 120 may allocate first occupancy information to voxels 608, 609 corresponding to the first voxel type where laser has passed. In the present invention, the first occupancy information may have a value of "0". Here, the passed state of laser means that the laser has passed through a corresponding region without reflection, which results from non-existence of an object at the corresponding region.

As shown in FIGS. 6B(b) and (c), the processing unit 120 may allocate second occupancy information to voxels 602, 603 corresponding to the second voxel type where laser has been reflected. In the present invention, the second occupancy information may have a value of "1". Here, the reflected state of laser means that the laser has collided with an object, which results from existence of an object at a corresponding region.

As shown in FIGS. 6B(b) and (c), the processing unit 120 may allocate third occupancy information to voxels 604, 605, 606, 607 corresponding to the third voxel type where laser has not reached. In the present invention, the third occupancy information was set to have the same value of "0.5". However, in some cases, the third occupancy information may include a plurality of values. That is, the occupancy information allocated to voxels corresponding to the third voxel type may have a different value. For instance, the processing unit 120 may determine occupancy information of voxels corresponding to the third voxel type where laser has not reached, based on a scanning result on a different reference region. That is, if the probability of the existence of an object at a region corresponding to voxels corresponding to the third voxel type is high, the processing unit 120 may allocate a value closer to 1 than 0.5, based on a scanning result on a different reference region. On the contrary, if the probability of the existence of an object at a region corresponding to voxels corresponding to the third voxel type is low, the processing unit 120 may allocate a value closer to 0 than 0.5, based on a scanning result on a different reference region. Thus, the processing unit 120 may allocate occupancy information of voxels corresponding to the third voxel type, based on a probability according to a scanning result on a different reference region.

As aforementioned, the processing unit 120 may define an occupancy state with respect to a plurality of voxels on a spherical coordinate system, based on the reflection signal of laser. The definition of the occupancy state may mean allocation of occupancy information to each of a plurality of voxels.

In the present invention, the processing unit 120 may allocate occupancy information to all voxels which exist on a spherical coordinate system. As a result, vectors corresponding to all of the voxels included in the spherical coordinate system may be respectively acquired. Such acquisition may be performed by the deep learning unit 130.

Figure 7A:
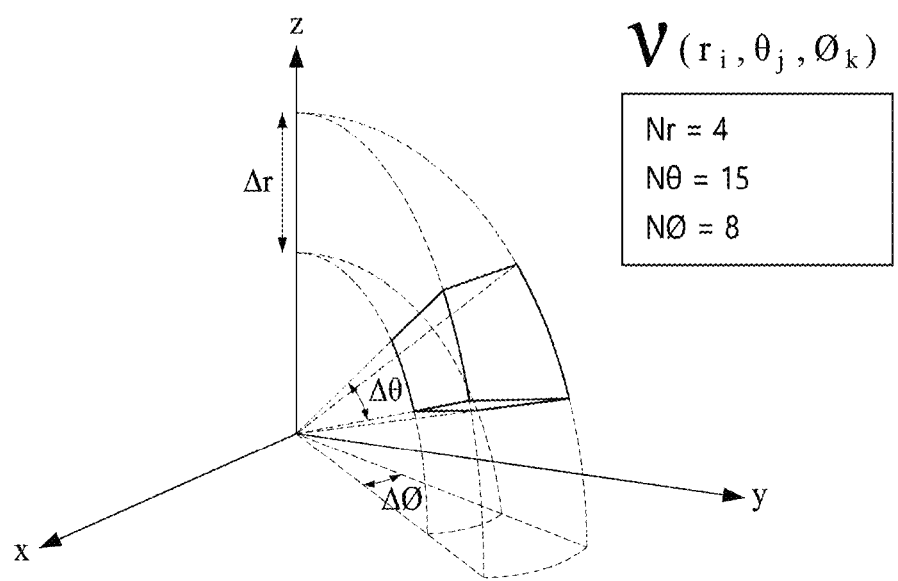

Hereinafter, a method of allocating occupancy information to each of a plurality of voxels will be explained in more detail. For convenience of explanations, as shown in FIG. 7A, it is assumed that the spherical coordinate system is segmented into i) 4 regions based on the radius distance (Nr=4), ii) 15 regions based on the polar angle (N$\theta$=15), and iii) 8 regions based on the radiation angle ($\theta$) (N$\Phi$=8). In this case, the spherical coordinate system may be segmented into a total of 480 (4×15×8) voxels. In this case, "i, j, k" for defining the voxels V(ri, $\theta$j, $\Phi$k) may be i∈[1, Nr=4], j∈[1, N$\theta$=15] and k∈[1, N$\Phi$=8], respectively.

Figure 7B:
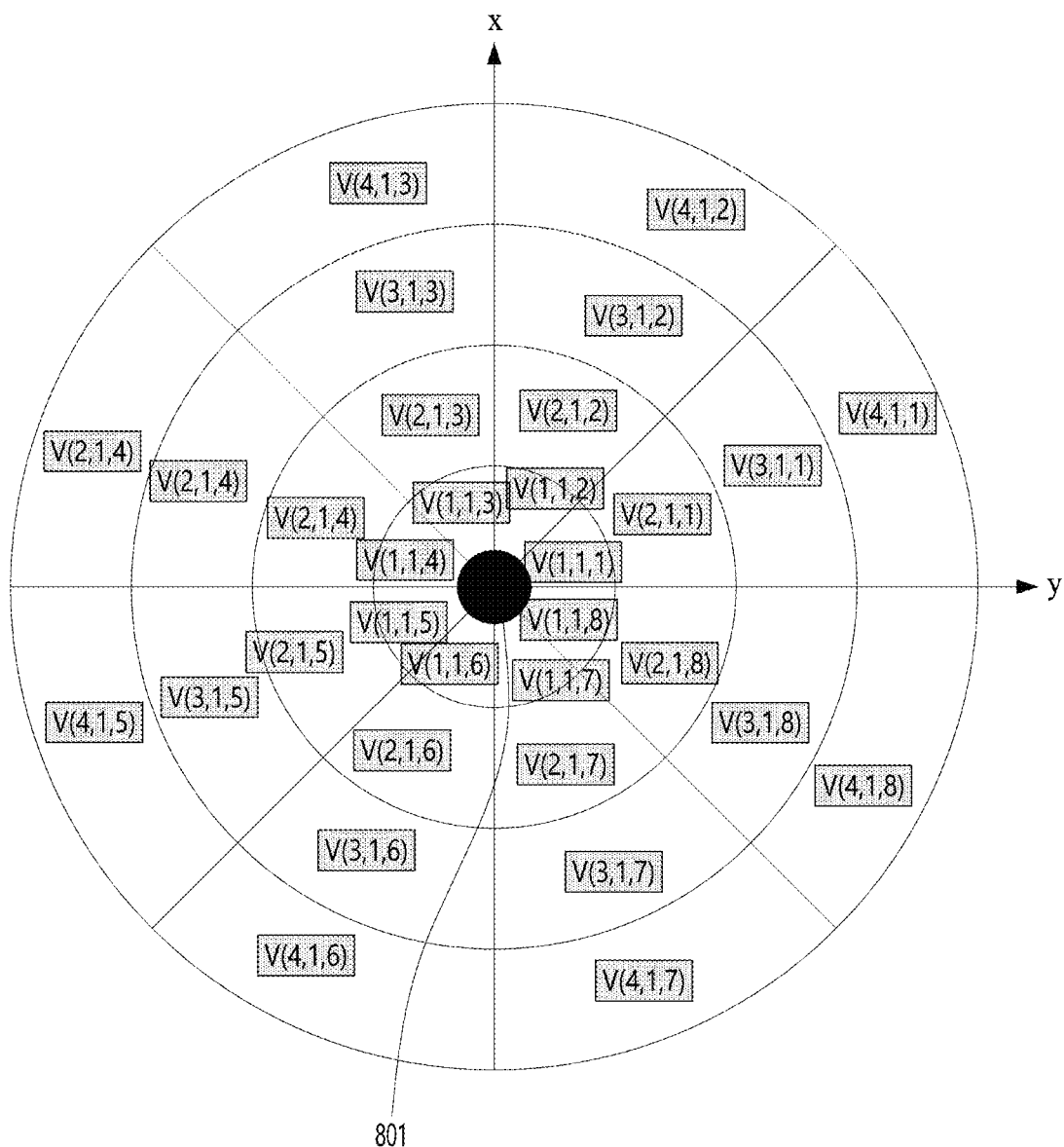

In this case, as shown in FIG. 7B, each of voxel regions may have its position specified to V(ri, $\theta$j, $\Phi$k). FIG. 7B shows a 2-dimensional (2D) coordinate system when 'j' of the polar angle ($\theta$) is 1 (j=1).

Figure 8A:
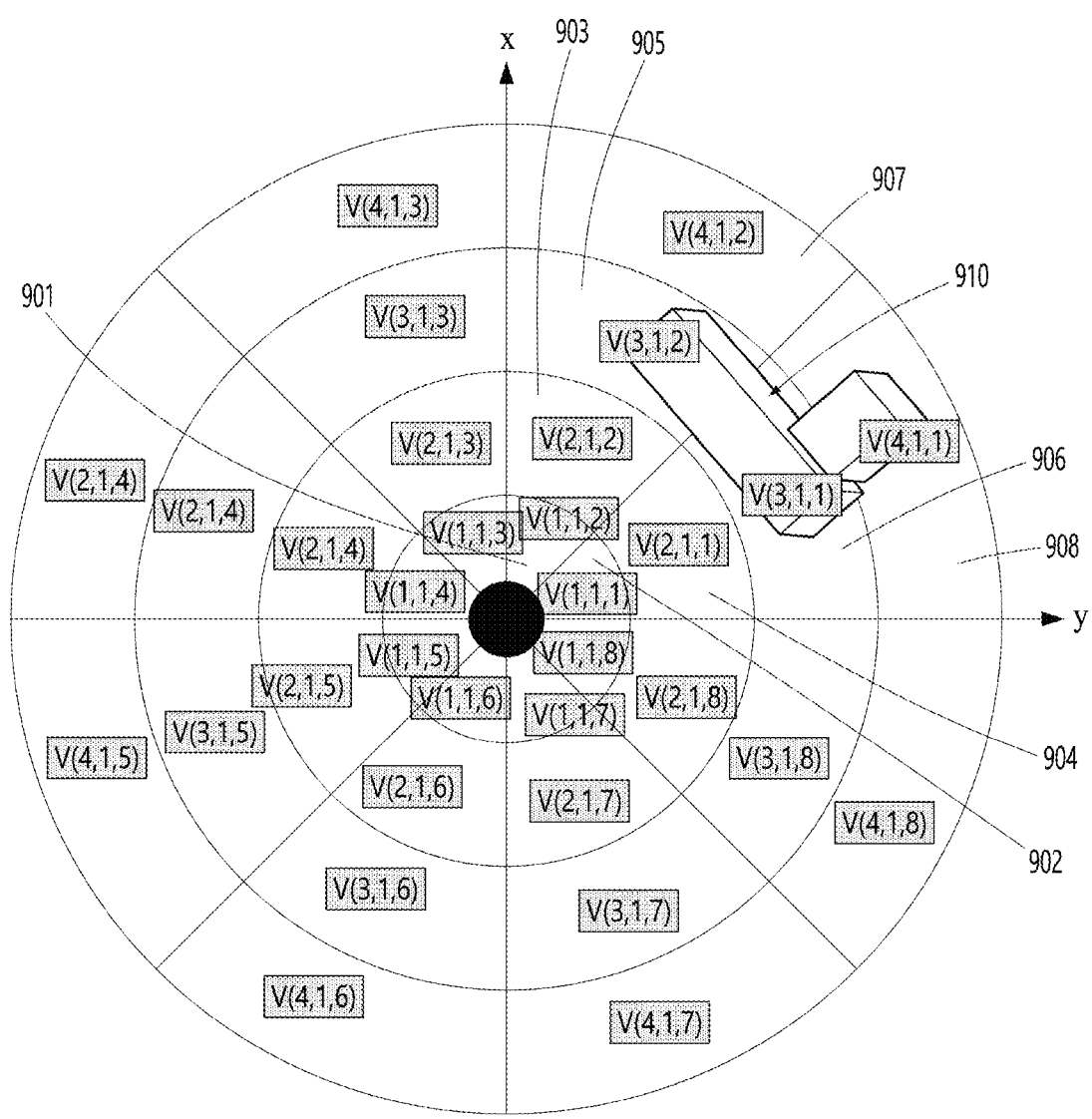
Figure 9B:
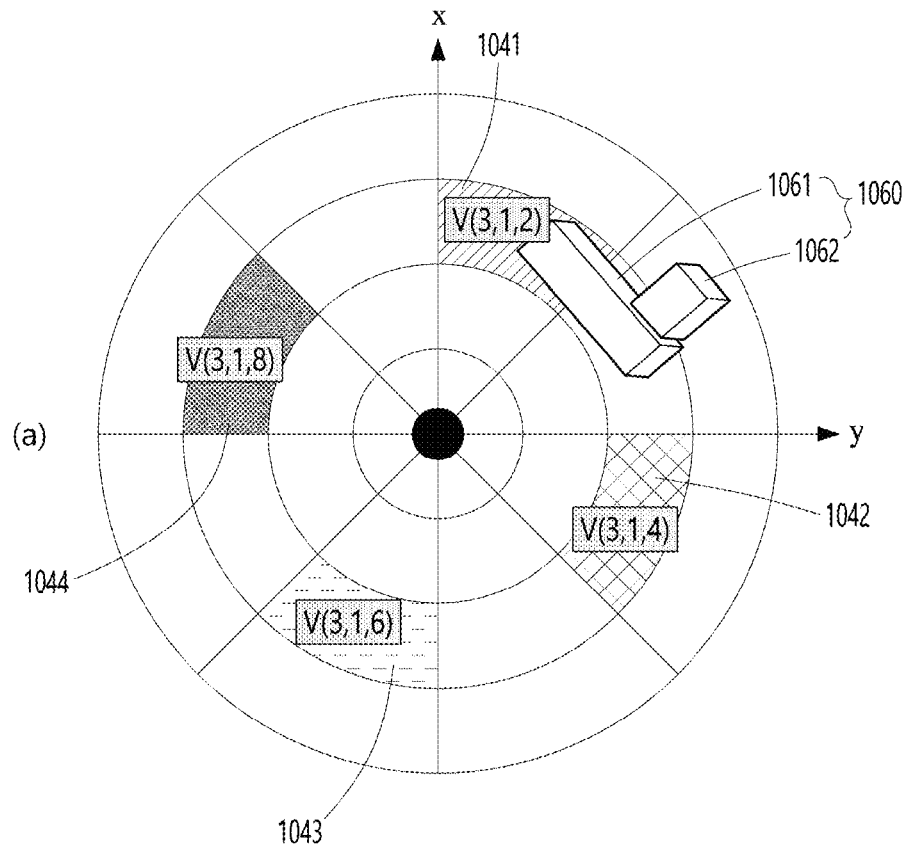
Figure 9C:
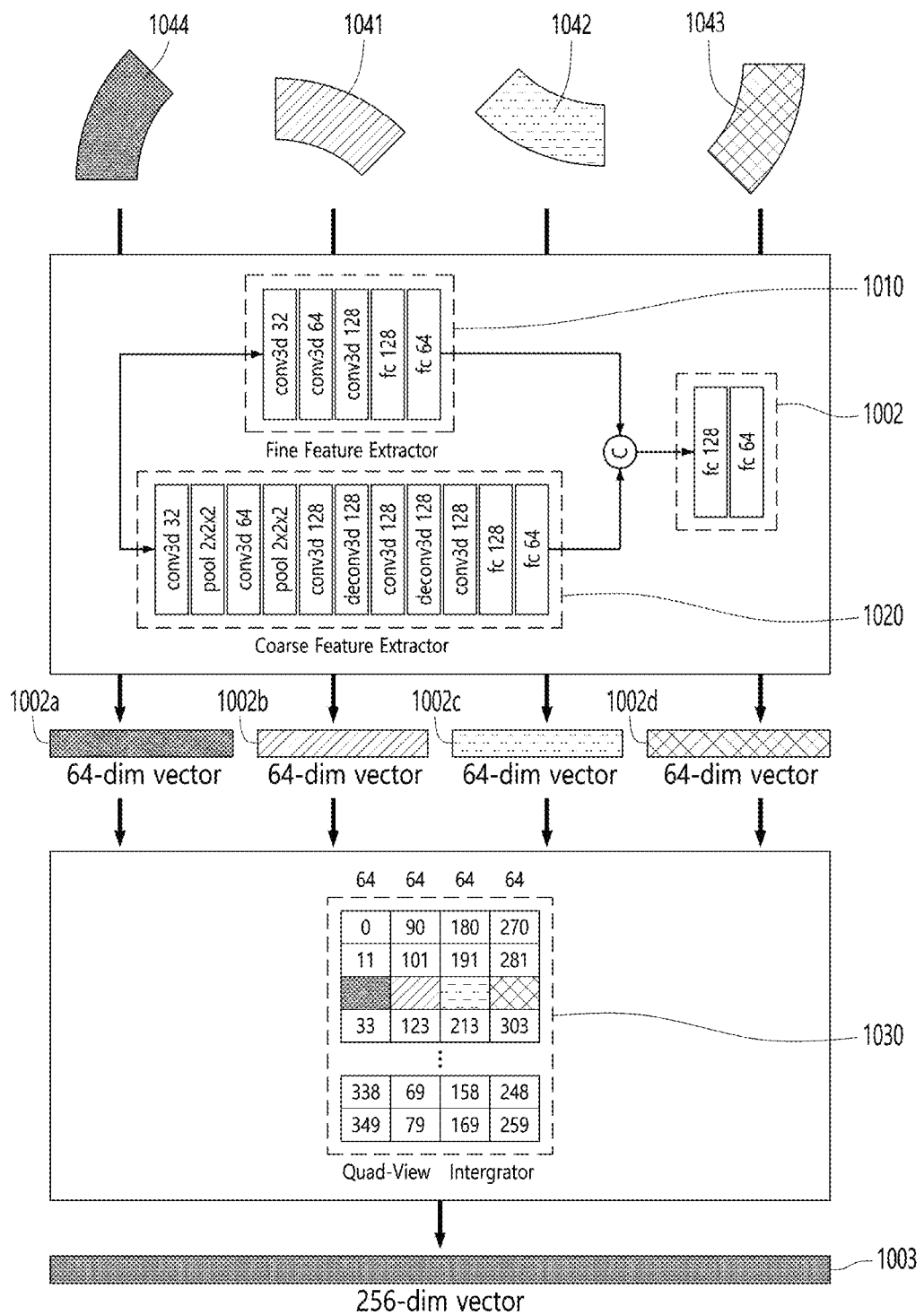

As shown in FIG. 8A, for explanations, it is assumed that an object 910 exists at regions corresponding to first to third voxels 905, 906, 908, on a spherical coordinate region corresponding to a surrounding space. Here, FIG. 8A shows a 2-dimensional (2D) coordinate system when 'j' of the polar angle ($\theta$) is 1 (j=1).

In the present invention, a reflection signal may be received at regions corresponding to the first and second voxels 905, 906, as a scanning result by the scanning unit 110. Although the object 910 exists even at a region corresponding to the third voxel 908, a reflection signal is not received at the region corresponding to the third voxel 908, because the region corresponding to the third voxel 908 is blocked by the object which is located at the region corresponding to the second voxel 906.

In a case where a reflection signal was received at a specific region, the processing unit 120 may allocate occupancy information to all voxels having the same polar angle and radiation angle as a voxel corresponding to the specific region where the reflection signal was received. That is, in a case where a voxel where an object exists is specified based on a reflection signal, the processing unit 120 may allocate occupancy information to all voxels having the same polar angle and radiation angle as the specified voxel.

Here, the voxel corresponding to the specific region where the reflection signal was received may be understood as a voxel corresponding to the aforementioned second voxel type. Here, "all voxels having the same polar angle and radiation angle as the specified voxel" means voxels having the same polar angle and radiation angle but having different radiuses.

For convenience of explanation, in the present invention, voxels having the same polar angle and radiation angle as the specified voxel but having different radiuses may be named as "peripheral voxels". For instance, in the case a reflection signal is received at a region corresponding to a specific voxel 906 (V(3, 1, 1)), the processing unit 120 may allocate occupancy information to peripheral voxels 902, 904, 908 of the specific voxel 906. That is, when the voxel 906 where a reflection signal was received is specified, the processing unit 120 may determine voxel types of peripheral voxels of the specified voxel 906, and allocate occupancy information to the peripheral voxels according to the determined voxel types.

More specifically, the processing unit 120 may determine at least one of voxels 902, 904 located closer to a reference region 801 than the specific voxel 906, as a first voxel type corresponding to "a voxel that a laser signal has passed". The processing unit 120 may determine the specific voxel 906 where the reflection signal has been received, as a second voxel type corresponding to "a voxel that a laser signal has been reflected". The processing unit 120 may determine at least one voxel 908 located farther from the reference region 801 than the specific voxel 906 where the reflection signal was received, as a third voxel type corresponding to "a voxel that a laser signal has not reached".

As shown in the first row (No. 1) of FIG. 8B, the processing unit 120 may uniformly allocate a value of "0" as occupancy information, to the at least one of voxels 902 (V(1, 1, 1)), 904(V(2, 1, 1)) corresponding to the first voxel type. The processing unit 120 may allocate a value of "1" as occupancy information, to the specific voxel 906 (V(3, 1, 1)) corresponding to the second voxel type, and uniformly allocate a value of "0.5" as occupancy information, to the peripheral voxel 908 (V(4, 1, 1)) corresponding to the third voxel type.

Thus, in a case where only the second voxel type (a voxel where an object exist) is specified, the processing unit 120 may allocate occupancy information to peripheral voxels, even if scan information (a reflection signal) about the peripheral voxels having the same polar angle and radiation angle as the specific voxel does not exist.

In the above manner, the processing unit 120 may allocate occupancy information to all voxels on the spherical coordinate system as shown in FIGS. 8B(a) and (b). FIG. 8B(b) shows voxel information when T is 2 (j=2). Although not shown, in a case where the polar angle is divided into 15 regions, the processing unit 120 may allocate all of voxel information corresponding to j=15.

In the above manner, the processing unit 120 may allocate occupancy information to all voxels on the spherical coordinate system.

As explained above, in a case where occupancy information is allocated to voxels based on a reflection signal of laser, a feature vector is extracted by using spatial information including voxels and occupancy information.

In the present invention, a feature vector having spatial information reflected thereto is extracted by a deep learning network which uses spatial information as input data (S530, refer to FIG. 5).

Here, the deep learning unit 130 may be configured to extract a feature vector corresponding to spatial information by using the spatial information. As shown in FIG. 9A, the deep learning unit 130 includes a deep learning network, and the deep learning network may include at least one data preprocessing module (or a preprocessor).

As shown, occupancy information of a specific voxel is input to the deep learning network as input data, and each voxel may be specified as $N_r$, $N\theta$, $N\Phi$.

Here, data 1001 inputted to the deep learning network is "B×Nr×Nθ×NΦ×1". Herein, the "B" may mean the number of batches. In some cases, the "B" may be omitted. Further, the "1" is occupancy information of the specific voxel, and may be changed to 1, 0, 0.5, etc., according to an occupancy state of the specific voxel as aforementioned.

The deep learning network of the present invention may include at least one of a fine feature extractor 1010 which performs a preprocessing with respect to spatial information, a coarse feature extractor 1020 and an integrator 1030.

The fine feature extractor 1010 and the coarse feature extractor 1020 may be designed to be parallel to each other. Vectors extracted from the fine feature extractor 1010 and the coarse feature extractor 1020 may be connected to each other along column, and the connected vectors may be used as input data of the integrator 1030.

The fine feature extractor 1010 may be configured to encode a structural relation among neighboring voxels. The fine feature extractor 1010 may extract vectors for describing a surrounding space in detail, by using occupancy information of a voxel (a target voxel) corresponding to inputted voxel information and neighboring voxels.

The fine feature extractor 1010 may be configured as a plurality of layers of a 3D convolution network. Further, the coarse feature extractor 1020 may be configured to design a structure for allowing each voxel to include information on a larger space, and extract vectors therefrom. The coarse feature extractor 1020 encodes features which are more coarse structurally from an input voxel, and consequently, reduces a feature dimension to ¼ of the original dimension through a 3D pooling layer. And the coarse feature extractor 1020 may restore the reduced feature dimension into the original dimension through a deconvolution layer.

Vectors extracted by the fine feature extractor 1010 and the coarse feature extractor 1020 may be configured as vectors of 64-dimension. Such vectors of 64-dimension are connected to each other along lines, and may become vectors of 128-dimension.

In the present invention, vectors extracted (or encoded) by the fine feature extractor 1010 and the coarse feature extractor 1020 may be named as sub-feature vectors. In this case, the vector extracted by the fine feature extractor 1010 may be named as a first sub-feature vector, and the vector extracted by the coarse feature extractor 1020 may be named as a second sub-feature vector.

The first and second sub-feature vectors may be connected to each other along lines, and a vector which combines the first and second sub-feature vectors may be named as a "sub-feature vector". The sub-feature vector 1002 may be used as input data of the integrator 1030.

Next, the integrator 1030 will be explained. The integrator may be configured to combine a sub-feature vector corresponding to a specific voxel, with a sub-feature vector corresponding to at least one peripheral voxel related to the specific voxel.

Here, at least one peripheral voxel related to the specific voxel may mean a peripheral voxel having the same radius distance and polar angle as the specific voxel, but having a different radiation angle. That is, in the present invention, the "peripheral voxels" do not necessarily mean neighboring voxels adjacent to each other, but may be voxels correlated with each other.

The deep learning unit 130 may generate a feature vector by using occupancy information of the specific voxel, and occupancy information of at least one peripheral voxel related to the specific voxel. For instance, as shown in FIG. 9B, the integrator 1030 may generate a unit vector by using occupancy information (or a sub-feature vector) of a peripheral voxel having +90° or −90° on the basis of a radiation angle (an azimuth angle) of a specific voxel 1041, V(3, 1, 2). In this case, the integrator may generate a unit vector by using occupancy information (or sub-feature vectors) of first to third peripheral voxels 1042, 1043, 1044 having the same radius distance and polar angle as the specific voxel 1041, but having radiation angles of Φ+90, Φ+180, Φ+270 on the basis of the radiation angle (Φ) of the specific voxel 1041. As shown in table of FIG. 9B(b), the integrator 1030 may generate a unit vector by using occupancy information "1" of the specific voxel 1041 (V(3, 1, 2)) (refer to 1051), occupancy information "0" of the first peripheral voxel 1042 (V(3, 1, 4)) (refer to 1052), occupancy information "0" of the second peripheral voxel 1043 (V(3, 1, 6)) (refer to 1053), and occupancy information "0" of the third peripheral voxel 1044 (V(3, 1, 8)) (refer to 1054).

Like this, in case of using voxel information of 4 directions on the basis of 90°, the integrator 1030 may be named as a quad-view integrator.

In the present invention, the number of radiation angle-based directions considered with the specific voxel, that is, the number of voxels is not limited, but may be variously modified in some cases.

As shown in FIG. 9C, the deep learning unit 130 may input spatial information of the specific voxel 1041 and the first to third peripheral voxels 1042, 1043, 1044 (including voxel specifying information (the radius distance, the polar angle and the radiation angle information) and occupancy information), as input data of fine feature extractor 1010 and the coarse feature extractor 1020. The deep learning unit 130 may extract sub-feature vectors 1002a, 1002b, 1002c, 1002d of the specific voxel 1041 and the first to third peripheral voxels 1042, 1043, 1044 by using the fine feature extractor 1010 and the coarse feature extractor 1020. And the deep learning unit 130 may generate a unit vector with respect to the specific voxel by combining the sub-feature vectors 1002*a*, 1002*b*, 1002*c*, 1002*d* of the specific voxel 1041 and the first to third peripheral voxels 1042, 1043, 1044 with each other through the integrator 1030. Thus, the integrator 1030 may generate unit vectors with respect to all voxels which are on the spherical coordinate system, and input the generated unit vectors to NetVLAD to thus extract feature vectors.

In the present invention, feature vectors including voxel information of not only a specific voxel but also peripheral voxels of the specific voxel are extracted. This may provide a method and system for localization capable of performing a location estimation by considering even information about a surrounding space.

Here, the feature vector is a vector representing spatial information (scan information) of the surrounding space scanned by the scanning unit 110, and such a feature vector may be a target to be compared with a preset reference map. As aforementioned, the feature vector may be named using various terms, and may be named as a global vector or a global descriptor vector, for instance.

In the present invention, once a feature vector is extracted, the feature vector is compared with preset reference map data, thereby estimating location information about a reference region (S540). The controller 150 may compare the feature vector extracted by the deep learning unit 130 with a preset reference map, thereby estimating location information about the reference region which is a target of localization. More specifically, the controller 150 may compare preset reference map data (e.g., a set of a plurality of vectors) with the feature vector, thereby specifying a vector closest (or most similar) to the feature vector from the preset reference map data. And the controller 150 may estimate location information matched with the specified vector, as location information about the reference region.

The controller 150 may compare a plurality of reference vectors included in the reference map data with the feature vector, thereby extracting a specific reference vector located within a reference distance (or a threshold distance) from the feature vector, from the plurality of reference vectors. And the controller 150 may estimate location information matched with the extracted specific reference vector, as location information about the reference region.

In a case where a plurality of specific reference vectors are located within the reference distance, the controller 150 may estimate location information matched with a reference vector close to the feature vector, as location information about the reference region.

As aforementioned, in the method and system for localization according to the present invention, information related to an occupancy state of an object may be represented on voxels, based on a reflection signal of laser. Here, in the present invention, a space is divided into voxels on the spherical coordinate system. This may allow the radiation characteristic of the laser to be reflected more precisely on the voxels on the spherical coordinate system, thereby enabling more precise localization.

Further, in the present invention, in the case of representing information related to an occupancy state of an object, an occupancy state about a space where laser has not reached is newly defined. This may allow a space blocked by an object such as a person or a structure to be additionally considered. In this case, occupancy information of the space where laser has not reached may be defined as information different from occupancy information of a region where laser has passed or a region where laser has been reflected. Thus, in the present invention, localization is performed by additionally considering a blocked space. This may allow localization to be performed with high accuracy even in an indoor space.

The present invention proposes a deep learning network including an integrator which can reflect information about a surrounding space of a specific voxel together with information about the specific voxel. Accordingly, features of a space which is a target of localization may be considered comprehensively, and consequently, performance of localization may be enhanced.

The aforementioned present invention may be executed by one or more processes in a computer, and may be implemented as a program which can be stored in a computer-readable medium.

Further, the aforementioned present invention can be implemented as a computer-readable code or instruction word in a program-recorded medium. That is, the present invention may be provided in the form of a program.

The computer-readable medium includes all types of recording devices for storing data which can be read by a computer system. Examples of the computer-readable medium include a Hard Disk Drive (HDD), a Solid State Disk (SSD), a Silicon Disk Drive (SDD), ROM, RAM, CD-ROM, a magnetic tape, a floppy disk, an optical data storage device, etc.

Further, the computer-readable medium includes a storage unit which may be a server or a cloud storage unit to which an electronic device can access through communications. In this case, the computer may download a program of the present invention from the server or the cloud storage unit, through wired or wireless communications.

Further, in the present invention, the aforementioned computer is an electronic device where a processor, i.e., a Central Processing Unit (CPU) is mounted, and there is no limitation on a type of the computer.

The foregoing embodiments are merely exemplary and are not to be construed as limiting the present invention. The scope of the present invention should be determined by reasonable interpretations of the appended claims, and all changes and modifications that fall within the metes and bounds of the claims, or equivalents of such metes and bounds are therefore intended to be embraced by the appended claims.

What is claimed is:

1. A localization method, comprising:
scanning a surrounding space by using laser outputted from a reference region;
processing spatial information about the surrounding space based on a reflection signal of the laser;
extracting feature vectors to which the spatial information has been reflected by using a deep learning network which uses the spatial information as input data; and
comparing the feature vectors with preset reference map data, and estimating location information about the reference region,
wherein in the processing of the spatial information, occupancy information related to an occupancy state of an object located in the surrounding space is allocated to a plurality of voxels on spherical coordinates corresponding to the surrounding space, based on the reflection signal of the laser which is reflected from the object.

2. The method of claim 1, wherein the plurality of voxels on the spherical coordinates are categorized into a first voxel type corresponding to a voxel that the laser has passed, a second voxel type corresponding to a voxel that the laser has been reflected due to the object, and a third voxel type corresponding to a voxel that the laser has not reached due to the object, and wherein in the processing of the spatial information, different occupancy information is allocated to each of the voxels corresponding to the first to third voxel types.

3. The method of claim 2, wherein the different occupancy information includes first occupancy information allocated to a voxel corresponding to the first voxel type that the laser has passed, second occupancy information allocated to a voxel corresponding to the second voxel type that the laser has been reflected, and third occupancy information allocated to a voxel corresponding to the third voxel type that the laser has not reached.

4. The method of claim 3, wherein the third occupancy information allocated to the voxel corresponding to the third voxel type is formed to have a value between the first occupancy information allocated to the voxel corresponding to the first voxel type and the second occupancy information allocated to the voxel corresponding to the second voxel type.

5. The method of claim 4, wherein the spherical coordinates are divided into the plurality of voxels different from each other in at least one of a radius distance (v), a polar angle($\theta$) and a radiation angle ($\Phi$), on the basis of the reference region, and wherein in the processing of the spatial information, when a voxel where the laser has been reflected is specified among the plurality of voxels, a voxel type of at least one voxel having the same polar angle and radiation angle as the specified voxel is determined.

6. The method of claim 5, wherein in the processing of the spatial information, a voxel located closer to the reference region than the specific voxel is determined as the first voxel type, a voxel located farther from the reference region than the specific voxel is determined as the third voxel type, and the specific voxel is determined as the second voxel type.

7. The method of claim 1, wherein in the extracting of the feature vectors, a feature vectors are generated by using occupancy information of the specific voxel, and occupancy information of at least one peripheral voxel related to the specific voxel.

8. The method of claim 7, wherein the specific voxel and the at least one peripheral voxel related to the specific voxel have the same radius distance and polar angle but have different radiation angles, on the basis of the reference region.

9. The method of claim 8, wherein the at least one peripheral voxel includes first to third peripheral voxels having different radiation angles from the specific voxel, and, wherein the specific voxel and the first to third peripheral voxels have a radiation angle difference of +90° or −90° from neighboring voxels thereof, on the basis of a radiation angle of the specific voxel.

10. The method of claim 9, wherein in the extracting of the feature vectors, a unit vector corresponding to the specific voxel is generated by combining occupancy information of the specific voxel and the first to third peripheral voxels with each other.

11. The method of claim 1, wherein in the extracting of the feature vectors, a sub-feature vector is extracted by using the spatial information as input data of each of a fine feature extractor and a coarse feature extractor.

12. The method of claim 11, wherein the sub-feature vector is a vector which combines a first sub-feature vector with a second sub-feature vector, and the first sub-feature vector is an output vector of the fine feature extractor and the second sub-feature vector is an output vector of the coarse feature extractor.

13. The method of claim 1, wherein in the estimating of the location information, a plurality of reference vectors included in the reference map data are compared with the feature vector, and a specific reference vector located within a reference distance from the feature vector is extracted from the plurality of reference vectors, and location information matched with the specific reference vector is estimated as location information about the reference region.

14. The method of claim 13, wherein in the estimating of the location information, where a plurality of specific reference vectors are located within the reference distance, location information matched with a reference vector close to the feature vector among the plurality of specific reference vectors is estimated as location information about the reference region.

15. A localization system having at least one processor, comprising:

a scanning unit configured to scan a surrounding space by using laser outputted from a reference region;

a processing unit configured to process spatial information about the surrounding space, based on a reflection signal of the laser;

a deep learning unit configured to extract feature vectors to which the spatial information has been reflected by using a deep learning network which uses the spatial information as input data; and a controller configured to compare the feature vectors with preset reference map data, and estimate location information about the reference region, wherein the processing unit allocates occupancy information related to an occupancy state of an object located in the surrounding space, to a plurality of voxels on spherical coordinates, based on the reflection signal of the laser which is reflected from the object.

* * * * *